US012735917B2

(12) United States Patent
Lee et al.

(10) Patent No.: US 12,735,917 B2
(45) Date of Patent: Sep. 15, 2026

(54) DOOR LOCK EQUIPPED WITH INDICATOR

(71) Applicants: Kwangtaek Lee, Daegu (KR); Daechul Kang, Daegu (KR)

(72) Inventors: Kwangtaek Lee, Daegu (KR); Daechul Kang, Daegu (KR)

(73) Assignee: JUNGHWA TECH CO., LTD., Daegu (KR)

( * ) Notice: Subject to any disclaimer, the term of this patent is extended or adjusted under 35 U.S.C. 154(b) by 0 days.

(21) Appl. No.: 19/207,278

(22) Filed: May 13, 2025

(65) Prior Publication Data

US 2026/0092475 A1 Apr. 2, 2026

(51) Int. Cl.
*E05B 41/00* (2006.01)
*E05B 13/00* (2006.01)

(52) U.S. Cl.
CPC ............ *E05B 41/00* (2013.01); *E05B 13/004* (2013.01)

(58) Field of Classification Search
CPC ...... E05B 41/00; E05B 13/004; E05B 17/226; E05B 39/00
See application file for complete search history.

(56) References Cited

U.S. PATENT DOCUMENTS

| | | | | |
|---|---|---|---|---|
| 4,854,061 | A * | 8/1989 | Khoshkish | G09F 11/04 40/907 |
| 9,845,620 | B2 * | 12/2017 | Bronner | E05B 63/0017 |
| 10,920,466 | B2 * | 2/2021 | Long | B64C 1/1407 |
| 11,359,407 | B2 * | 6/2022 | Kaverina | E05B 41/00 |
| 11,359,408 | B2 * | 6/2022 | Kim | E05B 39/00 |
| 11,391,058 | B2 * | 7/2022 | Schuberth | E05B 15/02 |
| 11,795,730 | B2 * | 10/2023 | Hood | E05B 41/00 |
| 11,808,055 | B2 * | 11/2023 | Fournier | E05B 17/226 |
| 11,814,873 | B2 * | 11/2023 | Clifford | E05B 47/0038 |
| 12,018,513 | B2 * | 6/2024 | Clifford | E05B 15/02 |
| 12,018,514 | B2 * | 6/2024 | Alvarez | E05B 15/02 |
| 12,123,220 | B2 * | 10/2024 | Xiang | E05C 3/042 |
| 2020/0190856 | A1 * | 6/2020 | Kaverina | E05B 41/00 |
| 2021/0148136 | A1 * | 5/2021 | Kim | E05B 39/00 |
| 2024/0076903 | A1 * | 3/2024 | Fournier | E05B 39/00 |
| 2025/0376873 | A1 * | 12/2025 | Wang | E05B 13/105 |

* cited by examiner

*Primary Examiner* — Christine M Mills
*Assistant Examiner* — Faria F Ahmad
(74) *Attorney, Agent, or Firm* — PARK LAW FIRM

(57) ABSTRACT

Disclosed is a door lock equipped with an indicator, the door lock being configured such that a first small spindle support is rotated forwards along a spiral guide groove when a lock button assembly of a body assembly is pressed, a small spindle cam is rotated along the first small spindle support during operation of the first small spindle support, an indicator cam coupled to an outer spring cage of a lock indicator assembly is rotated clockwise so as to allow "IN USE" displayed on an upper display part of the indicator cam and a lower display part of the outer spring cage to be exposed to the outside, and the indicator cam is rotated counterclockwise so as to allow "VACANT" displayed on an upper display part of the outer spring cage and a lower display part of the indicator cam to be exposed to the outside.

3 Claims, 14 Drawing Sheets

DOOR LOCK EQUIPPED WITH INDICATOR

BACKGROUND OF THE INVENTION

Field of the Invention

The present invention relates to a door lock equipped with an indicator configured to allow a user to clearly recognize a locked state or an unlocked state of the door lock with the naked eye from the outside.

Description of the Related Art

Generally, a door lock is installed on the entrance door of a building so as to restrict an outsider from entering the building. Further, door locks configured to protect privacy among users are installed on doors respectively used in various spaces partitioned from each other in the building.

Furthermore, in the case of a door lock installed on a bathroom door or a toilet door among the doors used in various spaces partitioned from each other in the building, the door lock is locked by pressing a lock button and is unlocked by operating an inner lever in the locked state of the door lock at the inside of the bathroom or the toilet. Further, the door lock is unlocked by a cylinder at the outside of the bathroom or the door. In this manner, the door lock may be used safely and conveniently.

However, in the case of the above-mentioned door lock installed on the bathroom door or the toilet door, even if the user locks the door lock by pressing the lock button at the inside of the bathroom or the toilet, the locked state of the door lock may not be visibly recognized from the outside. In this case, another user needs to check whether the door lock installed on the bathroom door or the toilet door is in the locked state or not, that is, whether the user is present in the toiler or bathroom, by operating an outer lever or knocking on the door, which may cause the user in the toilet or bathroom to feel uncomfortable and embarrassed.

Accordingly, Korean Patent No. 10-2291961 (entitled "INDICATOR TYPE DOOR LOCK") proposed a technique in which, in the case of a door lock installed on a bathroom door or a toilet door among the doors respectively used in various spaces partitioned from each other in the building, "CLOSED" or "OPEN" is displayed on the door lock so as to allow a user to recognize, from the outside, whether the door is in the locked state or not.

However, in the case of the indicator type door lock disclosed in Korean Patent No. 10-2291961, when a lock button is pressed at the inside of the bathroom or toilet, a pin rotation part including a driving pin and a guide rib is rotated in place by linear movement of a cam part including a guide pin and a cam surface. Further, when the pin rotation part is rotated, an indicator member formed of a pair of first and second display members colored in a predetermined color and a leaf spring is opened or closed with a shaft pin as an axis thereof, thereby exposing "CLOSED" displayed on a display part of a main body cover. In this manner, a user may visually recognize whether the door lock is locked or not from the outside. However, the indicator type door lock has a complicated structural configuration in which the indicator member is opened by pressing the lock button. Additionally, when the lock button for locking is pressed, the pin rotation part is converted to rotational movement through linear movement of the cam part, and the pin rotation part is rotated. In this case, the indicator member formed of the pair of first and second display members is opened, but smooth operation may not be guaranteed due to significantly large frictional resistance. Particularly, in order to increase usability, when a function of displaying "OPEN" is added in addition to the function of displaying "CLOSED", a display part configured to display "CLOSED" and a display part configured to display "OPEN" are respectively disposed on the upper portion and the lower portion of the main body cover. Accordingly, when the position of the indicator member is changed depending on whether the door lock is locked or not, a user may identify whether the door lock is locked or not through the highlighted display part (the display part configured to display "CLOSED" or the display part configured to display "OPEN"). However, since the display part configured to display "CLOSED" or the display part configured to display "OPEN" respectively disposed on the upper and lower portions of the main body cover are simultaneously exposed, a display function may be weakened and as such, usability may deteriorate.

RELATED ART DOCUMENT

Patent Document (Patent Document 1) Korean Patent No. 10-2291961 (registered on Aug. 23, 2021)

SUMMARY OF THE INVENTION

Therefore, the present invention has been made in view of the above problems, and it is an object of the present invention to provide a door lock equipped with an indicator configured to simply expose "IN USE" or "VACANT" to the outside depending on whether the door lock is locked or not, to maximally reduce frictional resistance during operation thereof, and to selectively and clearly display "IN USE" or "VACANT" through display windows respectively disposed at the upper portion and the lower portion of the door lock.

In accordance with the present invention, the above and other objects can be accomplished by the provision of a door lock equipped with an indicator, the door lock being configured such that a first small spindle support coupled to a small spindle of an outer spindle is rotatably moved forwards along a spiral guide groove in the small spindle when a lock button assembly of a body assembly is pressed for locking, a small spindle cam is rotated along the first small spindle support when the first small spindle support is operated, a horseshoe-shaped indicator cam coupled to an outer spring cage of a lock indicator assembly through a torsion spring and a shaft pin is rotated clockwise when the small spindle cam is rotated, thereby allowing "IN USE" displayed on an upper display part of the indicator cam and "IN USE" displayed on a lower display part of the outer spring cage to be exposed to the outside through display windows respectively provided at an upper portion and a lower portion of an outer plate, the first and second small spindle supports of a small spindle assembly, have been moved forwards by the lock button assembly, are moved rearwards by a spring so as to return to the initial positions thereof when an inner lever or a cylinder of an outer lever is operated for unlocking, and the indicator cam of the lock indicator assembly is rotated counterclockwise by the torsion spring when the small spindle cam is freed by return of the first small spindle support, thereby allowing "VACANT" displayed on an upper display part of the outer spring cage and "VACANT" displayed on a lower display part of the indicator cam to be exposed to the outside through the display windows respectively provided at the upper portion and the lower portion of the outer plate.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be described with reference to the accompanying drawings. However, the following embodiments are provided only for easier understanding of the present invention, and the contents of the present invention are not limited by the embodiments.

Figure 1:
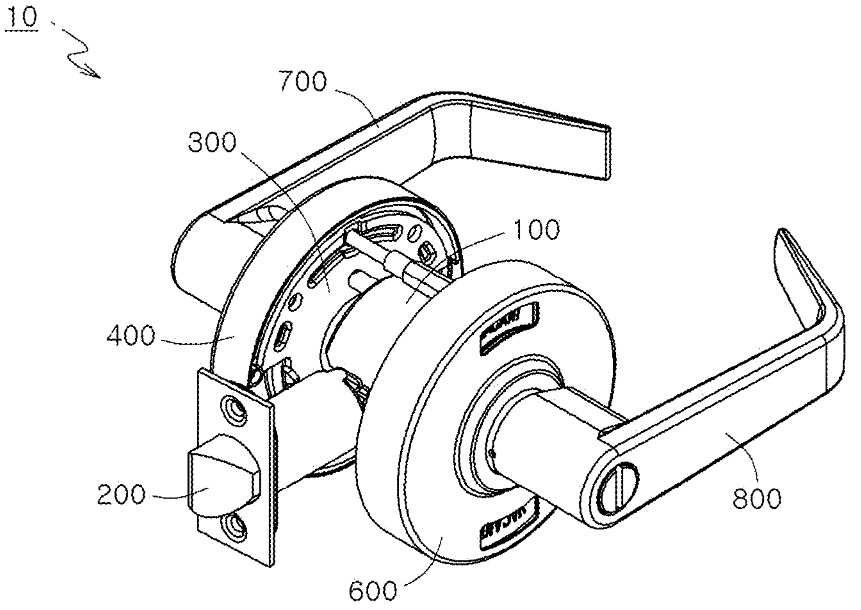
FIG. 1 is a perspective view of the present invention.
Figure 2:
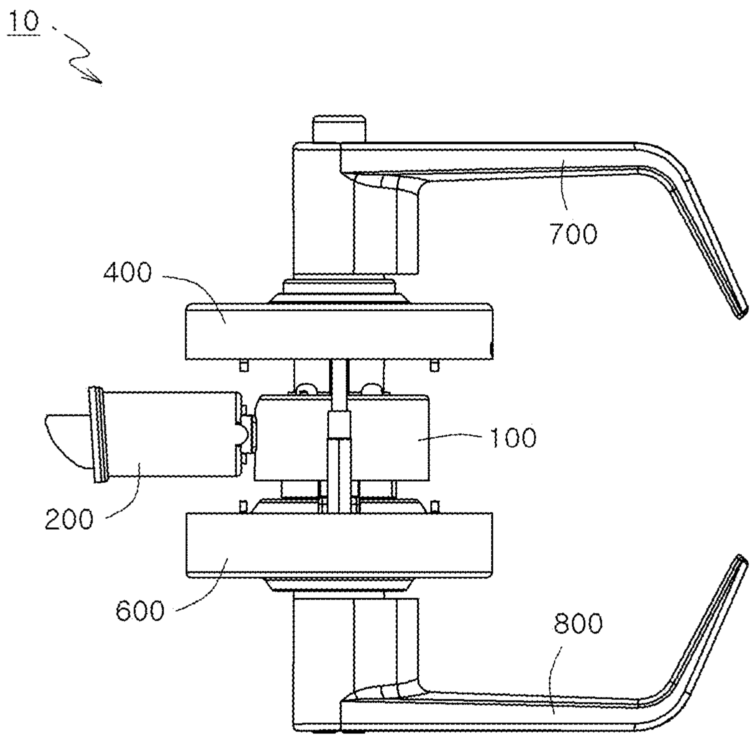
FIG. 2 is a view showing a planar configuration of the present invention.
Figure 5:
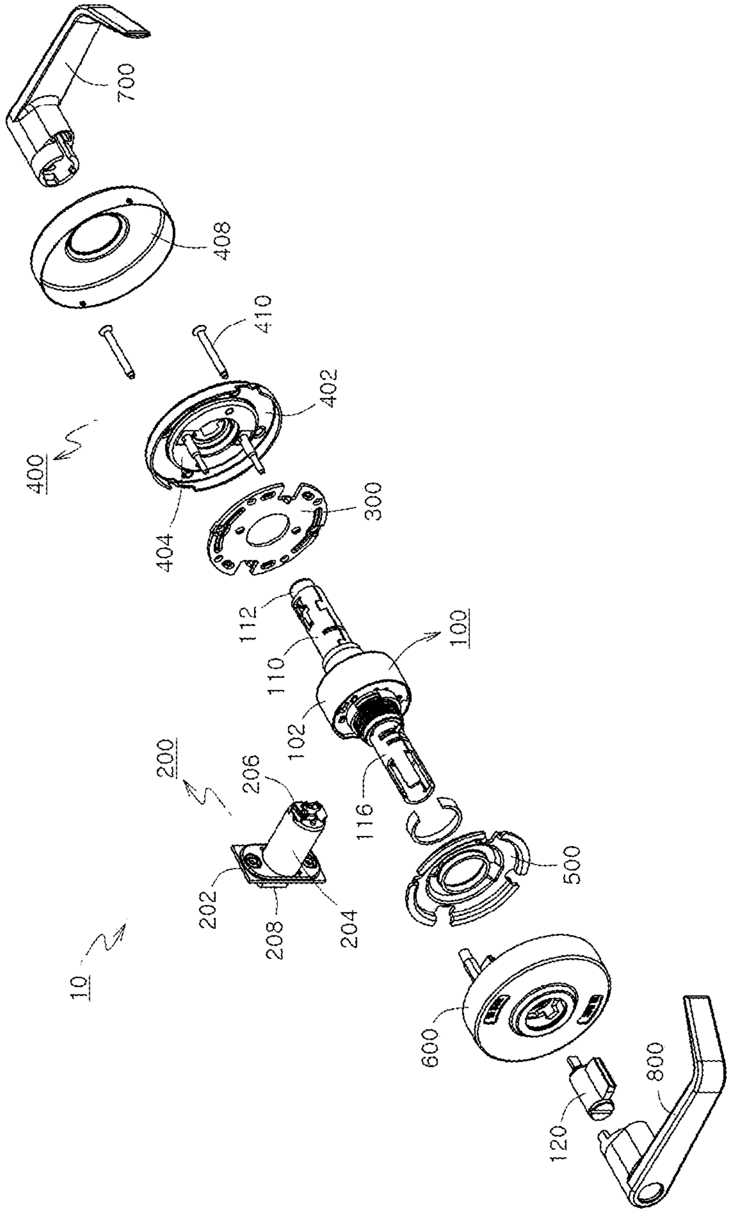
FIG. 5 is an exploded perspective view of the present invention.

FIG. 1 is a perspective view of the present invention, FIG. 2 is a plan view of the present invention, and FIG. 5 is an exploded perspective view of the present invention. A door lock 10 including a body assembly 100, a latch assembly 200 coupled to the front side of the body assembly 100, an inner plate assembly 400 coupled to an inner portion of the body assembly 100 with an inner mounting plate 300 interposed therebetween, a lock indicator assembly 600 coupled to an outer portion of the body assembly 100 with an outer mounting plate 500 interposed therebetween, and an inner lever 700 coupled to the body assembly 100 from the outside of the inner plate assembly 400, and an outer lever 800 coupled to the body assembly 100 from the outside of the lock indicator assembly 600.

Figure 6:
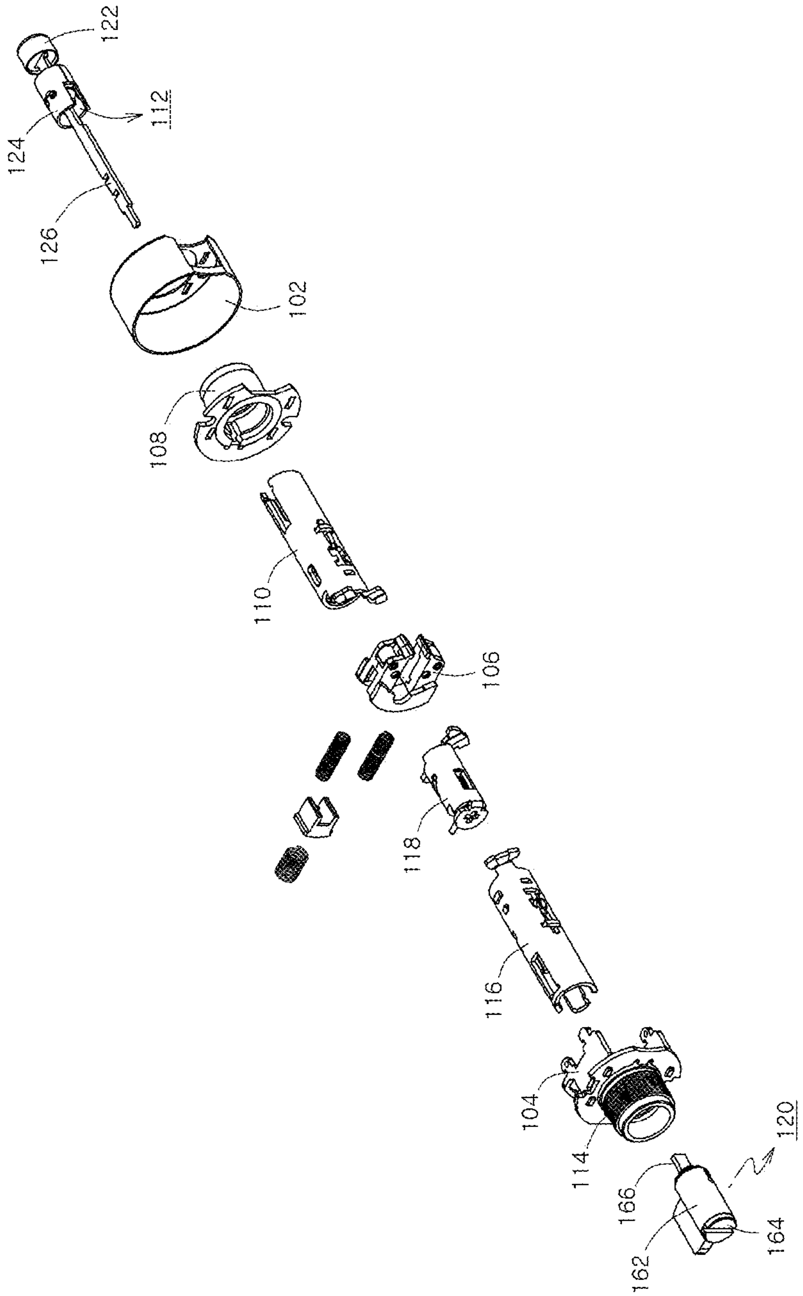
FIG. 6 is an exploded perspective view of a body assembly used in the present invention.

FIG. 6 is an exploded perspective view of the body assembly used in the present invention. The body assembly 100 used in the present invention includes a body housing 102, a slide plate 104 coupled to the inside of the body housing 102, a retractor 106 coupled to the slide plate 104, an inner spindle 110 coupled to the inside of the body housing 102 through an inner member 108, a lock button assembly 112 coupled to the inner spindle 110, an outer spindle 116 coupled to the outside of the body housing 102 through an inner member 114, a small spindle assembly 118 coupled to the outer spindle 116, and a cylinder 120 coupled to the outer spindle 116.

The lock button assembly 112 coupled to the inner spindle 110 of the body assembly 100 is formed of a pressing part 122, a guide tube 124, and a lock button lever 126. During assembly, the lock button lever 126 is coupled to the retractor 106 and the small spindle assembly 118 so as to perform interlocking operation.

Figure 7:
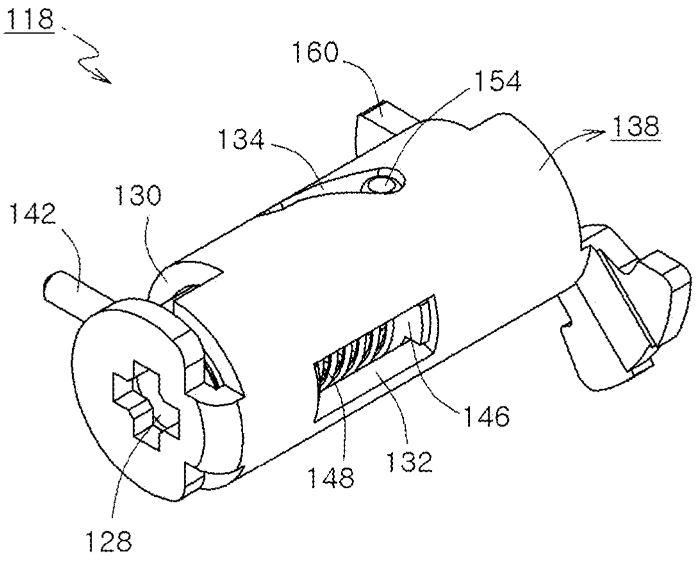
FIG. 7 is a perspective view of a small spindle assembly used in the present invention.
Figure 8:
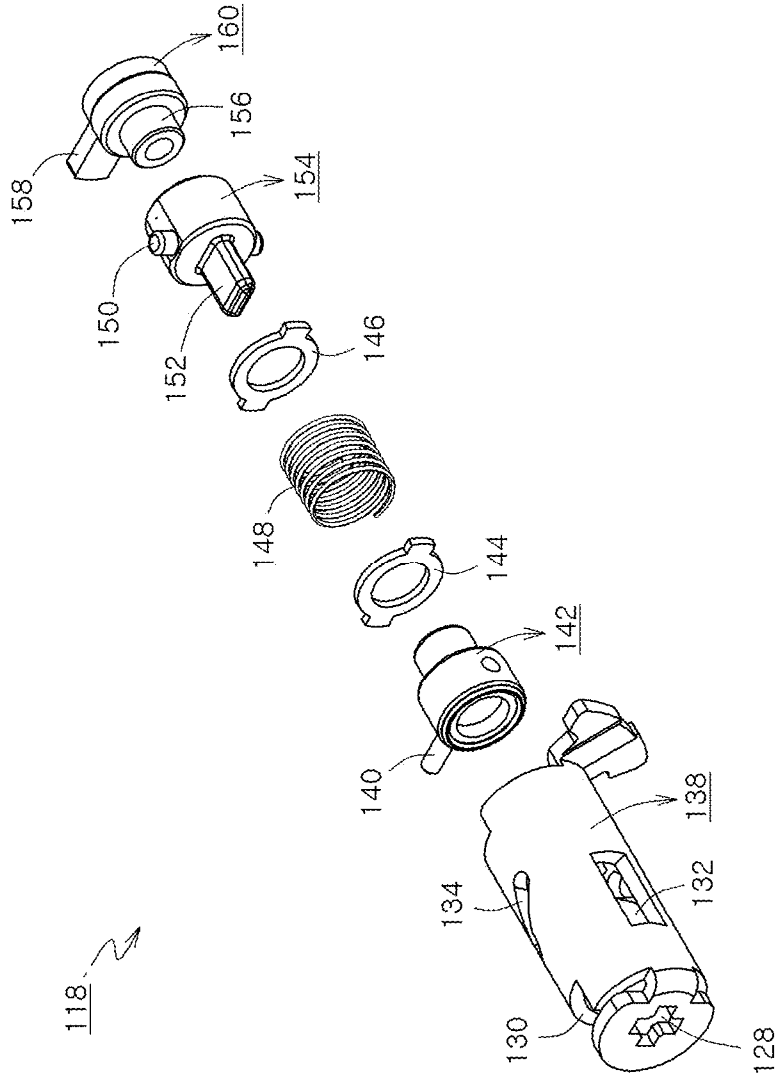
FIG. 8 is an exploded perspective view of the small spindle assembly used in the present invention.
Figure 9:
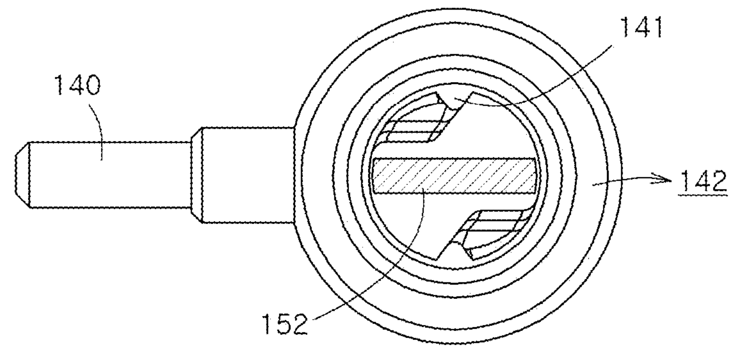
FIG. 9 is a side configuration view showing the locked state of a small spindle cam and a first small spindle support used in the present invention.
Figure 10:
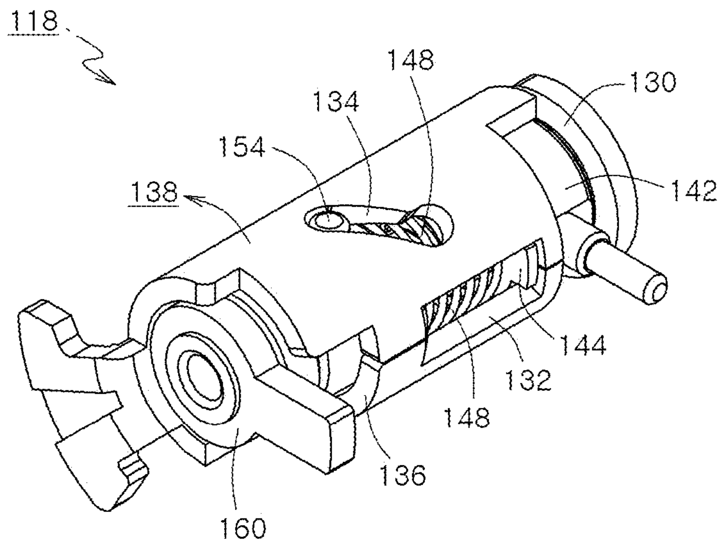
FIG. 10 is a perspective view of the small spindle assembly used in the present invention, when viewed from a different direction.

FIG. 7 is a perspective view of the small spindle assembly used in the present invention, FIG. 8 is an exploded perspective view of the small spindle assembly used in the present invention, FIG. 9 is a side configuration view showing the locked state of a small spindle cam and a first small spindle support used in the present invention, and FIG. 10 is a perspective view of the small spindle assembly used in the present invention, when viewed from a different direction. The small spindle assembly 118 coupled to the outer spindle 116 of the body assembly 100 is formed of an arc-shaped guide groove 130 formed in the rear portion of the outer side of a body forming a cylindrical operation chamber formed by a side plate having a locking hole 128 provided therein, a pair of straight guide grooves 132 and a pair of spiral guide grooves 134 formed in the central portion of the body in a state of avoiding interference with each other, a small spindle 138 having a locking groove 136 formed in the rear portion of inner side of the body, a small spindle cam 142 inserted into the operation chamber of the small spindle 138 so as to be coupled to the arc-shaped guide groove 130 through a pin 140 formed on the rear side of the body, the small spindle cam 142 having a pair of guide ribs 141 formed on the inner wall of the locking hole, a pair of washers 144 and 146 each coupled to the straight guide groove 132 through a coupling piece in the operation chamber of the small spindle 138, a spring 148 coupled between the pair of washers 144 and 146, a first small spindle support 154 inserted into the operation chamber of the small spindle 138 so as to be coupled to the spiral guide groove 134 through a pin 150 formed to protrude from a central portion of a body thereof, the first small spindle support 154 having a locking piece 152 formed on the outer side of the body and locked with the guide rib 141 of the small spindle cam 142 and a coupling groove formed in the inner side of the body, and a second small spindle support 160 having a coupling protrusion 156 formed on the outer side of a body thereof and coupled to the coupling groove in the first small spindle support 154 and a locking piece 158 formed on the rear portion of the inner side of the body and locked in the locking groove 136 in the small spindle 138.

The cylinder 120 fixedly coupled to the outer spindle 116 of the body assembly 100 is formed of a key outer cylinder 162, a key inner cylinder 164 coupled to the key outer cylinder 162, and a key lever 166 connected to the key inner cylinder 164 and locked with the locking hole 128 in the small spindle 138 of the small spindle assembly 118 during assembly.

The latch assembly 200 coupled to the front side of the body assembly 100 is formed of a face plate 202, a latch cylinder 204 fixedly coupled to the face plate 202, and a latch connection 206 formed to protrude from the rear upper and lower portions of the latch cylinder 204 and coupled to the body housing 102 of the body assembly 100, and a latch bolt 208 elastically installed with a spring in the latch cylinder 204 and coupled to the retractor 106 of the body assembly 100.

Figure 11:
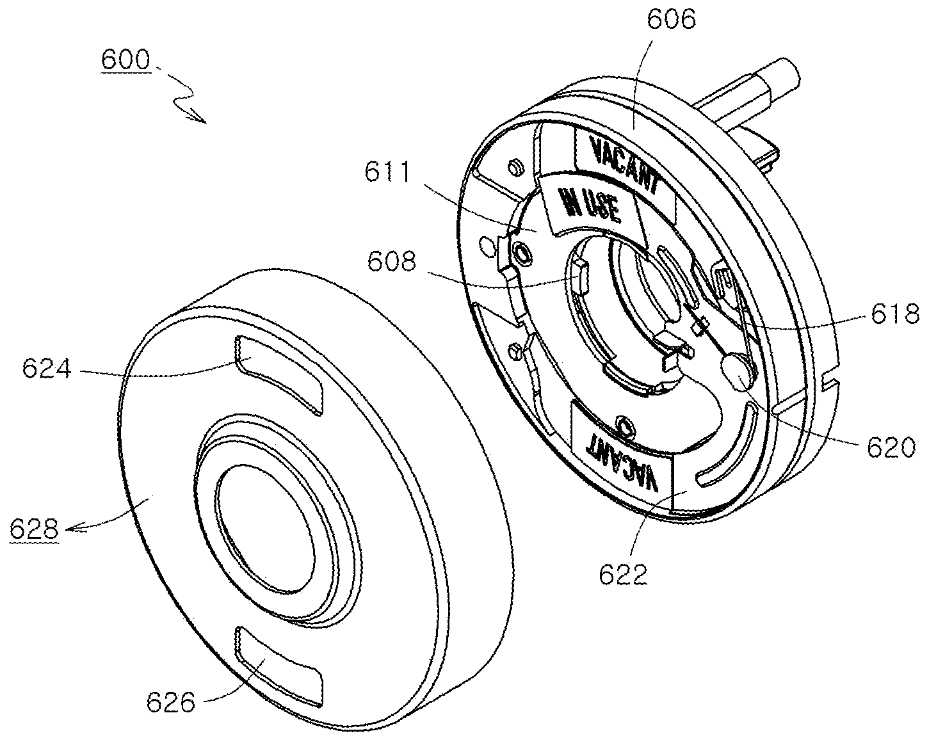
FIG. 11 is a partial exploded view of a lock indicator assembly used in the present invention.
Figure 12:
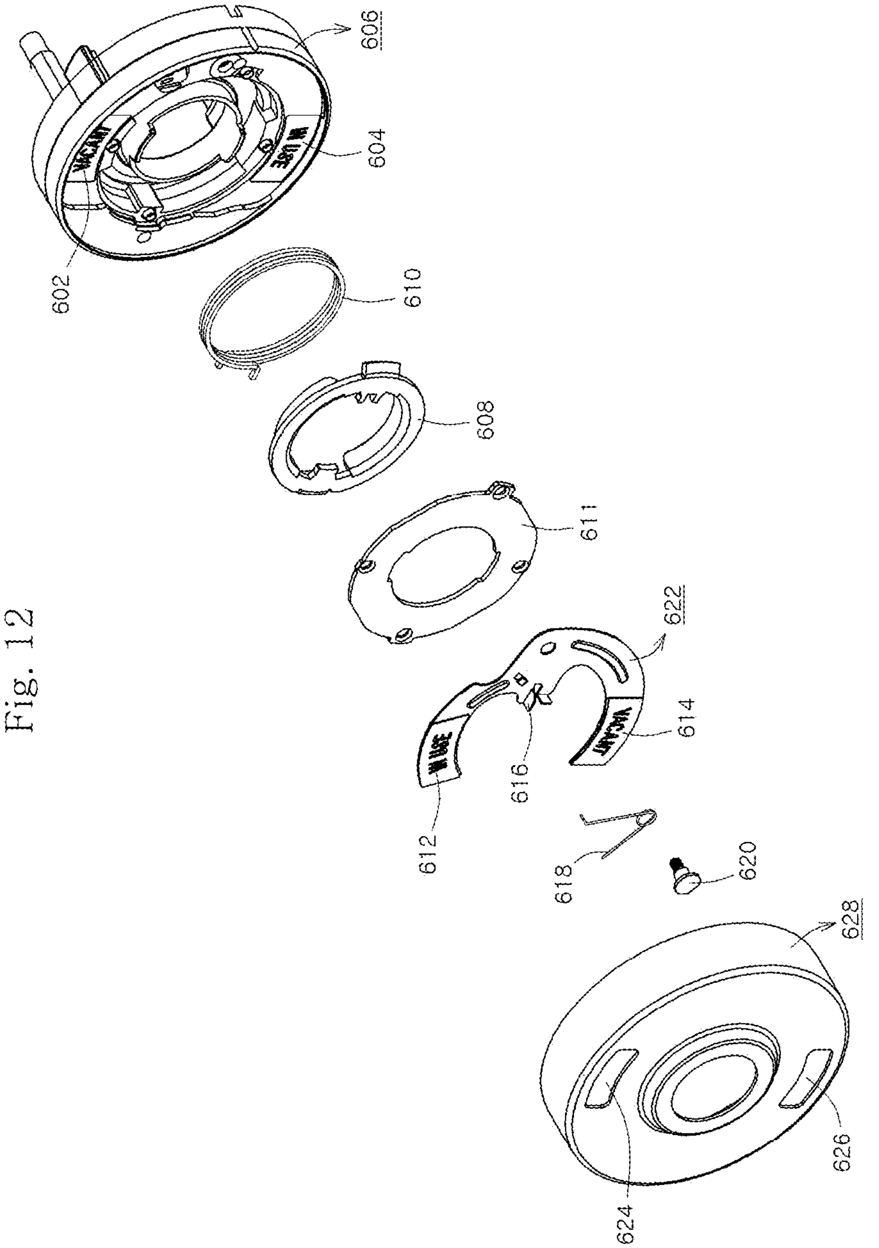
FIG. 12 is an exploded perspective view of the lock indicator assembly used in the present invention.

The inner plate assembly 400 coupled to the inner portion of the body assembly 100 with the inner mounting plate 300 interposed therebetween is formed of an inner spring cage 402, a rotation spring coupled to the inner spring cage 402 through a spring holder 404, and an inner plate 408 adapted to accommodate the inner spring cage 402. The inner plate assembly 400 is configured to be fixedly coupled to the lock indicator assembly 600 using mounting screws 410 with the inner mounting plate 300 and the outer mounting plate 500 interposed therebetween during assembly. FIG. 11 is a partial exploded perspective view of the lock indicator assembly used in the present invention, and FIG. 12 is an exploded perspective view of the lock indicator assembly used in the present invention. The lock indicator assembly 600 coupled to the outside of the body assembly 100 with the outer mounting plate 500 interposed therebetween is formed of an outer spring cage 606 having a display part 602 provided on the upper outer surface thereof and configured to display "VACANT" and a display part 604 provided on the lower outer surface thereof and configured to display "IN USE", a rotation spring 610 coupled to the outer spring cage 606 through a spring holder 608, a spring holder cover 611 configured to fix the spring holder 608 to the outer spring cage 606, a horseshoe-shaped indicator cam 622 having a display part 612 formed on the upper outer surface thereof and configured to display "IN USE", a display part 614 formed on the lower outer surface thereof and configured to display "VACANT", and a locking piece 616 formed on the inner central portion thereof and locked with the small spindle cam 142 of the small spindle assembly 118, the indicator cam 622 being connected to the outer spring cage 606 by a shaft pin 620 so that elasticity is provided in the counterclockwise direction by a torsion spring 618, and an outer plate 628 having display windows 624 and 626 respectively formed at the upper portion and the lower portion thereof.

The inner lever 700 is configured to be coupled to the inner spindle 110 of the body assembly 100 from the outside of the inner plate assembly 400 such that, when the inner lever 700 is rotated, the latch assembly 200 is operated by rearward movement of the retractor 106 and the lock button assembly 112 is unlocked. The outer lever 800 is configured to be coupled to the outer spindle 116 of the body assembly 100 from the outside of the lock indicator assembly 600 such that, when the outer lever 800 is rotated, the latch assembly 200 is operated by rearward movement of the retractor 106.

Figure 3:
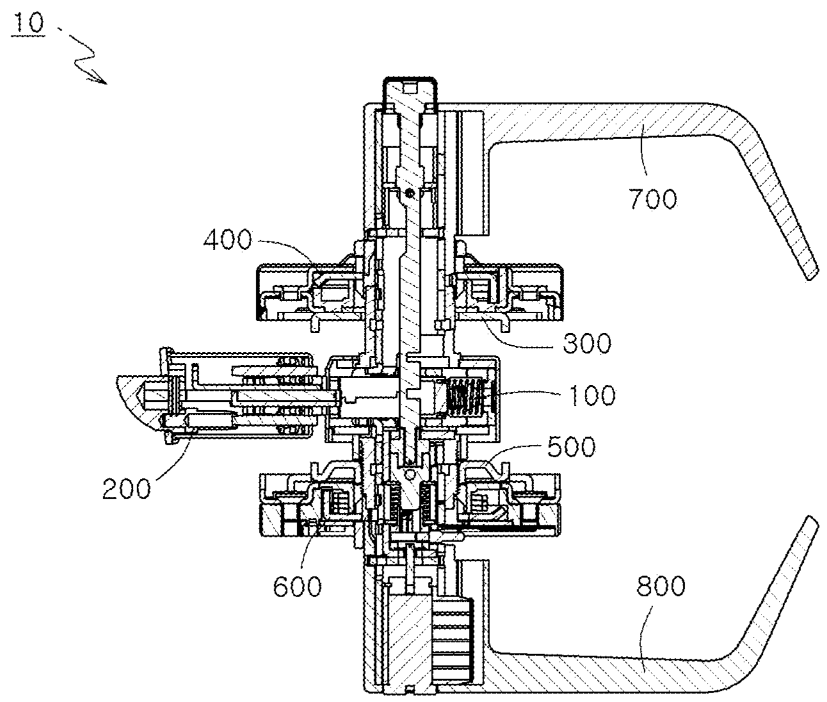
FIG. 3 is a view showing a planar cross-sectional configuration in the unlocked state of the present invention.
Figure 13:
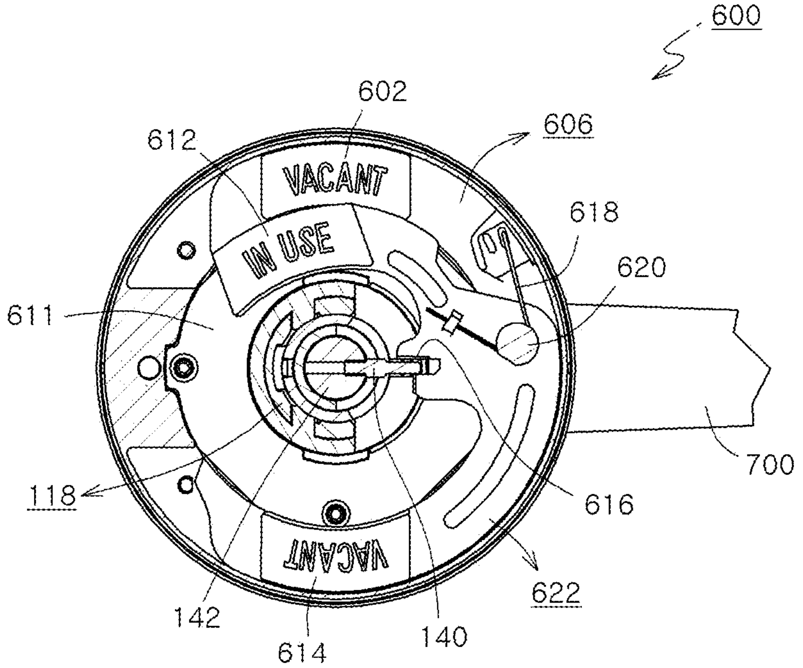
FIG. 13 is a side configuration view showing a "VACANT" display state of the lock indicator assembly used in the present invention.

The door lock 10 including the indicator of the present invention may be installed and used on a bathroom door or a toilet door. As shown in FIG. 3 and FIG. 13, before the lock button assembly 112 of the body assembly 100 is pressed, that is, when the door lock is unlocked, the indicator cam 622 of the lock indicator assembly 600 is rotated counter-clockwise around the shaft pin 620 by elastic force of the torsion spring 618, and "VACANT" displayed on the upper display part 602 of the outer spring cage 606 and "VACANT" displayed on the lower display portion 614 of the indicator cam 622 are exposed to the outside through the upper and lower display windows 624 and 626 of the outer plate 628, thereby enabling a user to clearly recognize with the naked eye that the bathroom or the toilet is vacant from the outside.

Figure 4:
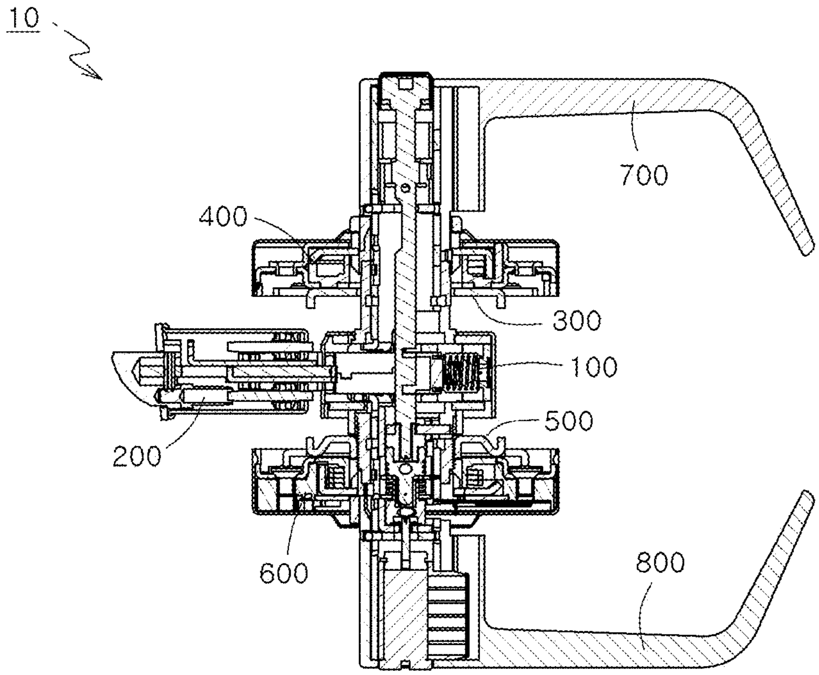
FIG. 4 is a view showing a planar cross-sectional configuration in the locked state of the present invention.
Figure 14:
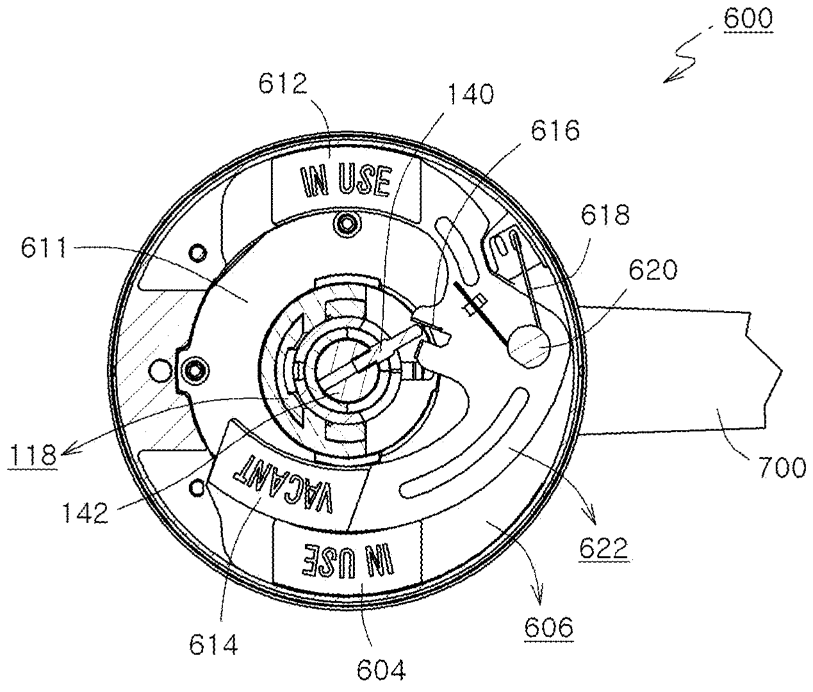
FIG. 14 is a side configuration view showing an "IN USE" display state of the lock indicator assembly used in the present invention.

Further, when the user enters the bathroom or the toilet and presses the lock button assembly 112 of the body assembly 100, as shown in FIGS. 4 and 14, the lock button assembly 112 moves the second small spindle support 160 of the small spindle assembly 118 forwards, and when the second small spindle support 160 is moved forwards, the first small spindle support 154 is rotatably moved forward along the spiral guide groove 134 in the small spindle 138. Here, when the first small spindle support 154 is rotatably moved forwards, the locking piece 152 of the first small spindle support 154 enters the locking hole in the small spindle cam 142 and is locked with a pair of guide ribs 141 formed on the inner wall of the locking hole such that the small spindle cam 142 is rotated along the first small spindle support 154. Here, when the small spindle cam 142 is rotated, the indicator cam 622 of the lock indicator assembly 600, which is locked through the pin 140 of the small spindle cam 142 and the locking piece 616, is rotated clockwise, and "IN USE" displayed on the upper display part 612 of the indicator cam 622 and "IN USE" displayed on the lower display part 604 of the outer spring cage 606 are exposed to the outside through the upper and lower display windows 624 and 626 of the outer plate 628, thereby enabling the user to clearly recognize with the naked eye that the bathroom or the toilet is in use from the outside.

Additionally, when the user operates the lever 700 after using the bathroom or the toilet, locking of the lock button assembly 112 is released by the retractor 106, and the door is opened by retraction operation of the latch assembly 200. At this time, when the lock button assembly 112 is unlocked, the second small spindle support 160 of the small spindle assembly 118, which has been moved forwards by the lock button assembly 112, and the first small spindle support 154, which has been rotatably moved forwards by the second small spindle support 160, are moved rearwards by the spring 148 and return to the initial positions thereof. Further, when the first small spindle support 154 returns to the initial position thereof, the small spindle cam 142 is separated from the first small spindle support 154 and does not interfere with the indicator cam 622 of the lock indicator assembly 600. Therefore, the indicator cam 622 is rotated counter-clockwise by the torsion spring 618 so as to expose "VACANT" displayed on the upper display part 602 of the outer spring cage 606 and "VACANT" displayed on the lower display part 614 of the indicator cam 622 to the outside through the upper and lower display windows 624 and 626 of the outer plate 628.

Therefore, the present invention may simplify the structure for the indicator cam 622 to be operated by pressing the lock button assembly 112, and may guarantee smooth operation maximally by reducing frictional resistance during each operation. In particular, depending on whether the door lock is locked or not, it is possible to selectively and clearly expose "IN USE" and "VACANT" through each of the upper and lower display windows 624 and 626.

As is apparent from the above description, the present invention provides a door lock configured to simplify a structure for operation of an indicator cam by pressing a lock assembly, perform smooth button to operation by maximally reduce frictional resistance during each operation, and to selectively and clearly expose, depending on whether the door lock is locked or not, "IN USE" and "VACANT" through two display windows respectively located at the upper and lower portions of an outer plate, thereby having an effect of improving usability by strengthening a display function.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A cylindrical-shaped door lock equipped with an indicator, the door lock comprising:

a body assembly;

a latch assembly coupled to a front side of the body assembly;

an inner plate assembly coupled to an inner portion of the body assembly with an inner mounting plate interposed therebetween;

a lock indicator assembly coupled to an outer portion of the body assembly with an outer mounting plate interposed therebetween;

an inner lever coupled to the body assembly from an outside of the inner plate assembly; and an outer lever coupled to the body assembly from an outside of the lock indicator assembly, wherein, when a lock button assembly coupled to an inner spindle of the body assembly is moved forwards, a first small spindle support of a small spindle assembly coupled to an outer spindle is rotatably moved forwards along a second small spindle support so as to rotate a small spindle cam, wherein, when the small spindle cam is rotated, an indicator cam of the lock indicator assembly is rotated clockwise such that "IN USE" displayed on an upper display part of the indicator cam and "IN USE" displayed on a lower display part of an outer spring cage are exposed to an outside through display windows respectively provided at an upper portion and a lower portion of an outer plate, wherein, when the lock button assembly is moved rearwards by the inner lever or a cylinder of the body assembly, the first small spindle support and the second small spindle support of the small spindle assembly return to initial positions thereof by a spring, and wherein, when the small spindle cam is freed by return of the first small spindle support, the indicator cam of the lock indicator assembly is rotated counterclockwise by a torsion spring such that "VACANT" displayed on an upper display part of the outer spring cage and "VACANT" displayed on a lower display part of the indicator cam are exposed to the outside through the display windows respectively provided at the upper portion and the lower portion of the outer plate.

2. The door lock according to claim 1, wherein the small spindle assembly comprises:

a small spindle having a cylindrical operation chamber formed by a side plate having a locking hole provided therein, the small spindle having an arc-shaped guide groove formed in a rear portion of an outer side thereof, the small spindle having a straight guide groove and a spiral guide groove formed in a central portion of a body thereof;

the small spindle cam inserted into the operation chamber of the small spindle and coupled to the arc-shaped guide groove through a pin formed on a rear portion of a body thereof, the small spindle cam having a pair of guide ribs formed on an inner wall of the locking hole;

a pair of washers each coupled to the straight guide groove through a coupling piece in the operation chamber of the small spindle;

a spring coupled between the pair of washers;

the first small spindle support inserted into the operation chamber of the small spindle and coupled to the spiral guide groove through a pin formed to protrude from a central portion of a body of the first small spindle support, the first small spindle support having a locking piece formed on an outer side of the body of the first small spindle support and locked with the small spindle cam, the first small spindle support having a coupling groove formed in an inner side of the body of the first small spindle support; and the second small spindle support having a coupling protrusion formed on an outer side of a body thereof and coupled to the coupling groove in the first small spindle support, the second small spindle support having a locking piece formed on a rear portion of an inner side of the body of the second small spindle support and locked with the small spindle.

3. The door lock according to claim 1, wherein the lock indicator assembly comprises:

the outer spring cage having the upper display part formed on an upper outer surface thereof, the upper display part being configured to display "VACANT", and the lower display part formed on a lower outer surface thereof, the lower display part being configured to display "IN USE";

a rotation spring coupled to the outer spring cage through a spring holder;

a spring holder cover configured to fix the spring holder to the outer spring cage;

an indicator cam having a display part formed on an upper outer surface thereof, the display part on the upper outer surface of the indicator cam being configured to display "IN USE", and a display part formed on a lower outer surface thereof, the display part on the lower outer surface of the indicator cam being configured to display "VACANT", the indicator cam having a locking piece formed on an inner central portion thereof and locked with the small spindle cam of the small spindle assembly, the indicator cam being connected to the outer spring cage by a shaft pin such that elasticity is provided in a counterclockwise direction by the torsion spring.

* * * * *